United States Patent [19]

Segal

[11] 3,976,387
[45] Aug. 24, 1976

[54] HOLE SAW DRILL AND ARBOR ASSEMBLY

[76] Inventor: Fred Segal, 545 Fairhill Drive, Akron, Ohio 44313

[22] Filed: June 2, 1975

[21] Appl. No.: 583,204

[52] U.S. Cl. .................................. 408/204; 144/23
[51] Int. Cl.² ........................................ B23B 51/04
[58] Field of Search ........... 428/204, 206, 239, 193, 428/224, 225, 703; 279/1 B, 1 T; 143/20, 23

[56] References Cited
UNITED STATES PATENTS

| | | | |
|---|---|---|---|
| 2,779,361 | 1/1957 | McKiff | 408/204 X |
| 3,262,474 | 7/1966 | Enders | 144/23 X |
| 3,267,975 | 8/1966 | Enders | 144/23 X |
| 3,784,316 | 1/1974 | Bittern | 408/204 |
| 3,825,362 | 7/1974 | Hougen | 408/204 X |
| 3,880,546 | 4/1975 | Segal | 408/204 |

*Primary Examiner*—Leon Gilden

[57] ABSTRACT

A quick-locking arbor, pilot drill, and hole saw assembly having particular utility with relatively small diameter hole saws in which one end of the pilot drill is received within a bore in the arbor, with a spring or other tension means surrounding the shank of the drill. The inserted end of the drill carries a washer and drill drive or sleeve, and the spring is trapped between the washer and a bushing which is held in the arbor body. A collar is carried on the pilot drill intermediate its ends and has camming surfaces integral therewith. The hole saw, being an elongate, hollow, cylindrical cutting member, has internal cam means which cooperate with the cam surfaces of the collar on the pilot drill so that upon relative rotation therebetween, the pilot drill is urged away from the arbor against the face of the spring or tension means, which is compressed between the washer and the end of the bushing, whereby the saw is locked between the end of the arbor and the collar. Stop means are provided on the forward end of the arbor and the rearward end of the hole saw collar to limit the degree of rotational movement between the saw and the arbor and thereby limit the axial movement of the drill upon engagement of the same. These stop means also serve as driving means for the saw.

8 Claims, 6 Drawing Figures

HOLE SAW DRILL AND ARBOR ASSEMBLY

BACKGROUND OF THE INVENTION

This invention relates primarily to hole saws and in particular relates to a unique locking means for assembling an arbor, pilot drill, and hole saw which has particular utility with regard to relatively small diameter saws.

DESCRIPTION OF THE PRIOR ART

The following patent prior art is known to Applicant:

| | |
|---|---|
| Blanch et al | U.S. Pat. No. 1,645,736 |
| Sandberg et al | U.S. Pat. No. 2,564,451 |
| Spiller | U.S. Pat. No. 2,626,667 |
| McKiff | U.S. Pat. No. 2,779,361 |
| Mueller et al | U.S. Pat. No. 2,852,967 |
| Stewart | U.S. Pat. No. 3,138,183 |
| Enders | U.S. Pat. No. 3,267,975 |
| Trevathan | U.S. Pat. No. 3,390,596 |
| Morse | U.S. Pat. No. 3,647,310 |
| Meshulam | U.S. Pat. No. 3,758,221 |
| Bittern | U.S. Pat. No. 3,784,316 |
| Segal | U.S. Pat. No. 3,880,546 |

Perhaps the most pertinent of the above-noted prior art is Segal U.S. Pat. No. 3,880,546 in which spring-loaded locking means for interconnecting an arbor and a cylindrical hole saw are disclosed. The particular locking means disclosed therein, however, involve utilization of cam surfaces on the base plate of the saw and spring-loaded T-shaped studs carried by the arbor which cooperate with the cam surfaces on the base of the hole saw for locking and driving purposes.

While the invention disclosed therein is adequate for its intended purpose, it is believed apparent that when relatively small diameter saws are involved, the relative dimensions, such as the diameter of the base of the saw, etc., are such that utilization of stud members such as disclosed in U.S. Pat. No. 3,880,546 is not feasible as a practical matter. The present invention is intended to overcome this difficulty while still achieving a quick locking arrangement.

SUMMARY OF THE INVENTION

It has been discovered that a quick release locking arrangement between an arbor, pilot drill, and a hole saw can be achieved notwithstanding the fact that the hole saw is of a relatively small diameter dimension, with the quick lock capability being achieved without sacrifice of the security of the interlocking arrangement so that the apparatus may be assembled quickly but will be held securely under the various forces encountered during the cutting operation.

It has been discovered that this object can be achieved by providing an arbor having an internal axially extending bore into which one end of the pilot drill is inserted. The inserted end of the drill has a washer and drill drive or sleeve secured thereto. A bushing is then provided in a press fit relationship to the inside of the bore, and a spring is trapped between one end of the bushing and the washer.

It has been found also that the drill can be provided with a collar intermediate its ends and having cam surfaces thereon and, further, that the hole saw itself can be provided with an internal camming means which will coact with the cam surfaces on the collar of the drill so that upon relative rotation therebetween, the drill will be urged outwardly and the spring will be compressed between the washer and one end of the bushing. In this fashion the end of the saw will be trapped and locked between the collar and the end of the arbor and held against axial movement by the force of the spring.

It has been discovered that such an arrangement, when supplemented with axially extending stop members on the end of the arbor and the end of the saw for locking and driving purposes, will result in a hole saw assembly which can be quickly assembled and yet will be securely held against chattering or other problems which are normally encountered during operation of hole saws.

Furthermore, it has been discovered that all of these cam surfaces and camming means, as well as the spring tensioning means, etc., can be provided in the overall assembly completely internally thereof without increasing the diameter of the saw in any way, whereby relatively small diameter saws can be accommodated.

Accordingly, production of an improved arbor, pilot drill, and hole saw assembly having the above-noted characteristics becomes the principal object of this invention, with other objects thereof becoming more apparent upon a reading of the following brief specification, considered and interpreted in view of the accompanying drawings.

BRIEF DESCRIPTION OF THE PREFERRED EMBODIMENTS

Figure 1:
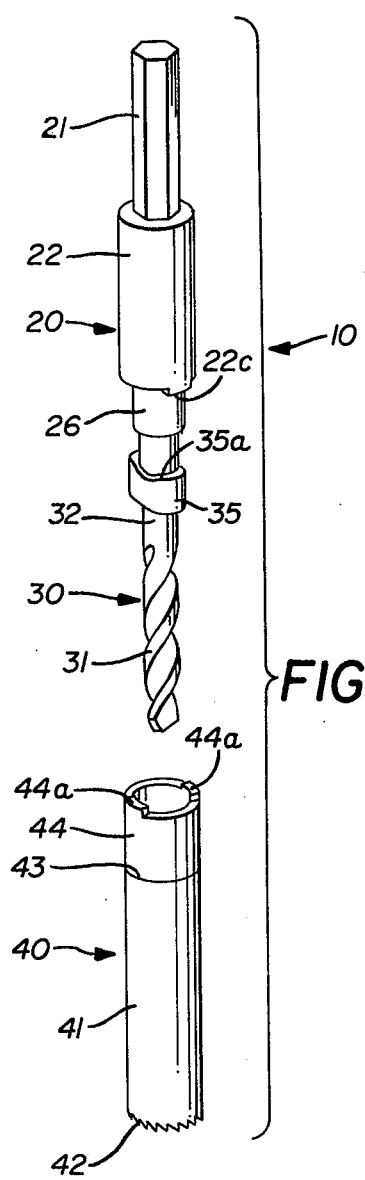
FIG. 1 is an exploded perspective view of the overall assembly.

Referring to FIG. 1, it will be noted that the overall assembly generally consists of three main components, namely, the arbor 20, the pilot drill 30, and the hole saw 40.

The arbor 20 consists of a spindle 21 projecting from one end of an arbor body 22, with a pair of locking and driving lugs 22c,22c projecting from the opposed end of the arbor body 22. It should be noted that the spindle, which normally is hexagonal in cross section, also has its inserted end received in a complementally-shaped first bore 22a in arbor body 22.

The body 22 also has an internal axial second bore 22b in its opposed end communicating with first bore 22a and forming a shoulder at its point of juncture therewith. Received within the first bore 22a is a drill drive member 23 which is cylindrical in shape and secured to the inserted end 33 of drill shank 32. A washer 24 is also received in the bore 22b and seats on the shoulder formed by the junction between first bore 22a and second bore 22b. Both drill drive or sleeve 23 and washer 24 are movable along the axis of arbor body 22 with drill 30 as will be described. Also received within the bore 22b is a spring 25, which encircles shank 32 of drill 30 and has one end resting against the washer 24.

The drill 30 is elongate in nature and has a cutting tip 31 on one end. This end is connected to the opposed inserted end 33 by shank 32, and as will be noted from FIG. 3 of the drawings, the opposed end 33 carries drill drive 23 and washer 24 and is received in the first and second bores with the spring 25 surrounding the shank 32.

A cylindrical bushing 26 is also inserted into the bore 22b and surrounds a portion of the shank 32. This bushing is secured to the inner walls of the bore 22b of arbor body 22 and has its own axial bore 26a so that the shank 32 of drill 30 may be moved in an axial direction relatively of bushing 26 and arbor body 22.

Figure 3:
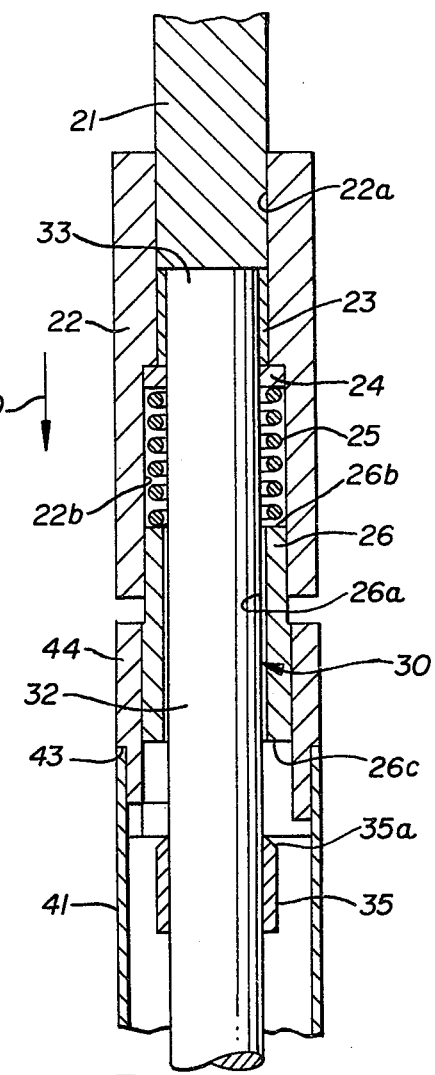
FIG. 3 is a further elevational view in section.

As noted above, one end of spring 25 rests against washer 24, and as will also be noted from FIG. 3 of the drawings, the opposed end thereof rests against the inserted end 26b of bushing 26, thereby normally being retained in uncompressed condition.

Figure 2:
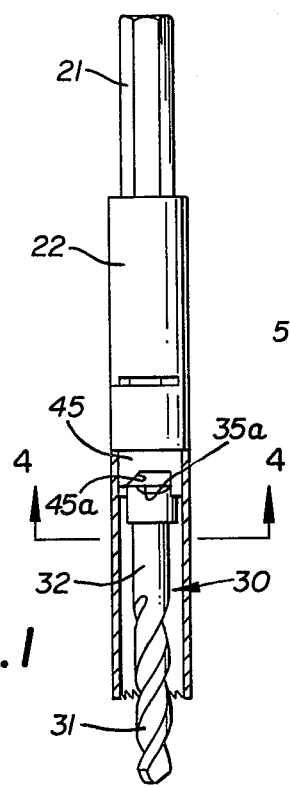
FIG. 2 is an elevational view partially broken away in section showing the assembly in assembled condition.

The shank 32 of drill 30 also carries a collar 35 thereon, as best shown in FIGS. 1 through 3 of the drawings. Collar 35 has sloping cam surfaces 35a,35a disposed on the opposed sides of the same for cooperation with cam means which will be described below.

Turning next then to the saw 40 and referring in particular to FIGS. 1 through 3, it will be noted that the saw 40 is an elongate cylindrical member having a body 41 and a cutting end 42. The opposed end 43 is joined to an adapter 44 by means of welding, or if desired, the adapter 44 and the drill body 41 could be cast as one piece.

On the end of the adapter 44 are projecting lugs 44a, 44a which perform stopping and driving purposes and cooperate with the lugs 22c,22c of the arbor as will be described below.

Figure 6:
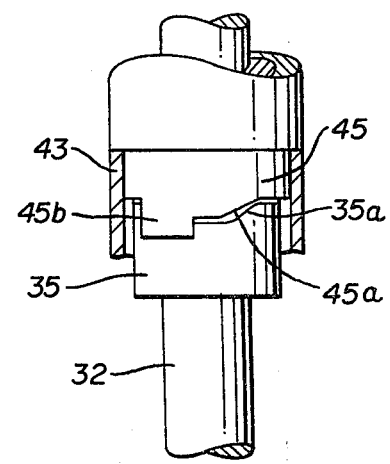
FIG. 6 is an elevational view partially in section and showing the locked condition.

Referring in particular then to FIG. 6, it will be noted that internally of the adapter 44 is a cam member 45 which is integral therewith. This cam member is a hollow, cylindrical member having a slightly smaller diameter than the diameter of the hole saw body 41 and having, on its upper edges, cam members 45a,45a.

In use or operation of the apparatus, it will first be assumed that the same has been assembled to the condition shown in FIG. 1 in that the drill 30 has been inserted into the bore 22a and counterbore 22b of the arbor body 22, with washer 24 and drill drive 23 secured to the end 33 thereof.

Figure 4:
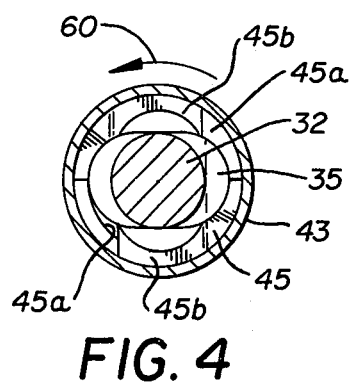
FIG. 4 is a sectional view taken along the lines 4—4 of FIG. 2 showing the device just prior to locking the same.

In order to attach the hole saw 40 to the arbor 20 and drill 30, it is simply necessary to slip the same down over the projecting shank of the drill and over the exposed end 26c of bushing 26. At that point the assembly would resemble FIG. 4.

Rotation in the direction of arrow 60, or counterclockwise, will cause the cam surfaces 35a,35a of the collar 35 of the drill to be brought into contact with the cam members 45a,45a of the adapter 44 on the saw. This movement will urge the drill 30 away from the adapter against the force of the spring 25 in the direction of arrow 50. During this movement the spring 25 is compressed between washer 24 and end 26b of bushing 26.

Figure 5:
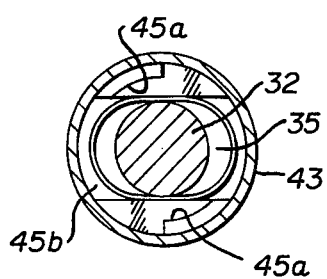
FIG. 5 is a view similar to FIG. 4 showing the device in locked condition.

As the cam members 45a,45a continue to ride on the surfaces 35a,35a, the cooperation between these two surfaces and the tension of the spring member 25 will draw the entire assembly into locked condition as shown in FIGS. 3 and 5 of the drawings. The amount of rotation possible at this point is limited by the presence of the stop and locking lugs 22c,22c on the arbor and 44a,44a on the drill so that when they come into contact with each other, the entire assembly will be locked together as shown in FIGS. 5 and 6. In this regard cam surfaces 35a,35a are dimensioned so that just before the cam members 45a,45a reach the ends thereof, the lugs will come into contact.

At this point it is merely necessary to insert the spindle 21 of the arbor into the driving drill, and the device is ready for operation. The contact between the lugs 22c,22c and 44a,44a will provide sufficient supporting surfaces to resist the torque encountered during the cutting operation, and the combination of the action of the cam members 45a,45a and cam surfaces 35a,35a and the spring 25 will assure that the entire assembly is securely held together in an axial condition to avoid chattering or other difficulties normally encountered in operating saws of this nature.

Accordingly then, it has been shown how a quick assembly arbor, pilot drill, and hole saw can be provided in a minimum of space, that is, in a relatively small diameter saw. In this regard it should be noted that while it has been stated herein that the invention has particular utility with regard to relatively small diameter saws, it is believed that within reasonable limits the principle disclosed herein would have application on larger diameter saws, and the invention is not intended to be limited to any particular size saw or drill.

An additional advantage of this type construction is the fact that in most of the prior art, it is necessary to provide a spindle 21 with a through opening and then provide a tapped and threaded hole running radially into the body of the arbor 22 in order to hold the drill 30 in place. These extra machining operations are not required with this particular construction. Also, the time-consuming job of locating, aligning, and locking the drill in the arbor is eliminated.

While a full and complete description of the invention has been set forth in accordance with the dictates of the Patent Statutes, it should be understood that modifications can be resorted to without departing from the spirit hereof or the scope of the appended claims.

What is claimed is:

1. A hole saw assembly, comprising;
  A. an arbor having
    1. a body with first and second ends, and
    2. a spindle projecting axially from said first end of said body;
  B. an elongate pilot drill having
    1. one end movably received within said body of said arbor, and
    2. its opposed end projecting axially from said second end of said body of said arbor;
  C. stop means
    1. secured at least partially internally of said body of said arbor, and
    2. encircling a portion of said pilot drill;
  D. tension means
    1. carried by said pilot drill and disposed internally of said body of said arbor, and
    2. contacting said stop means;
  E. a collar fixed to said pilot drill intermediate its ends and having cam surfaces thereon; and
  F. an elongate cylindrical cutting member having
    1. cam means carried internally thereof for camming engagement with the cam surfaces of said collar to lock said pilot drill and said cylindrical cutting member and to urge said pilot drill away from said arbor against the force of said tension means upon relative rotation between said cutting member and said pilot drill.

2. The assembly of claim 1 wherein locking and driving means are carried by said second end of said arbor and said cutting member.

3. The assembly of claim 2 wherein said locking and driving means include a plurality of axially projecting lugs.

4. The assembly of claim 1 wherein a washer is carried by the end of said pilot drill that is received within the body of said arbor; said tension means including a spring trapped between said washer and said stop means.

5. The assembly of claim 1 wherein a drill drive member is carried by the end of said pilot drill that is received within said body of said arbor.

6. A hole saw assembly, comprising;
   A. an arbor having
      1. an arbor body with first and second ends;
   B. said arbor having an axial bore opening in said first end thereof and a second bore in axial communication with said first bore and opening into said second end of said arbor body;
   C. an elongate spindle received in said first bore;
   D. an elongate pilot drill having first and second ends;
   E. said first end of said pilot drill being received within said first and second bores;
   F. a drill drive member secured to said first end of said pilot drill;
   G. a cylindrical bushing fixed within said second bore in encircling relationship with said pilot drill;
   H. tension means
      1. received within said second bore between said bushing and said drill drive member in encircling relationship with said pilot drill;
   I. a collar fixed to said pilot drill intermediate its ends and having cam surfaces thereon; and
   J. an elongate, cylindrical cutting member having
      1. cam means carried internally thereof for camming engagement with the cam surfaces of said collar to lock said pilot drill and said cylindrical cutting member and to urge said pilot drill away from said arbor against the force of said tension means upon relative rotation between said cutting member and said pilot drill.

7. The assembly of claim 6 wherein an adaptor is secured within said cutting member; said cam means being formed on said adaptor.

8. The assembly of claim 6 wherein locking and driving means are carried by said second end of said arbor and said cutting member.

* * * * *